United States Patent
Pon et al.

(10) Patent No.: US 10,038,981 B2
(45) Date of Patent: Jul. 31, 2018

(54) SYNCHRONOUS SCANNING TERRESTRIAL NETWORKS FOR MEASUREMENTS FOR CROWDSOURCING AND POSITIONING

(71) Applicant: QUALCOMM Incorporated, San Diego, CA (US)

(72) Inventors: Rayman Pon, Cupertino, CA (US); Ju-Yong Do, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/220,313

(22) Filed: Jul. 26, 2016

(65) Prior Publication Data
US 2018/0035258 A1 Feb. 1, 2018

(51) Int. Cl.
*H04W 4/02* (2018.01)
*H04L 12/26* (2006.01)
(Continued)

(52) U.S. Cl.
CPC ............. *H04W 4/027* (2013.01); *H04L 43/16* (2013.01); *H04W 40/005* (2013.01); *H04W 84/12* (2013.01)

(58) Field of Classification Search
CPC .... H04W 64/003; H04W 24/08; H04W 88/08
(Continued)

(56) References Cited

U.S. PATENT DOCUMENTS

2008/0008141 A1* 1/2008 Tchigevsky ............. H04W 8/18
370/338

2009/0184872 A1* 7/2009 Ruutu ................... G01S 5/0205
342/357.29
(Continued)

FOREIGN PATENT DOCUMENTS

| WO | WO-0210987 A1 | 2/2002 |
| WO | WO-2011016804 A1 | 2/2011 |
| WO | 2015070052 A1 | 5/2015 |

OTHER PUBLICATIONS

U.S. Appl. No. 14/866,777, filed Sep. 25, 2015 by QUALCOMM Incorporated, 47 pages.
(Continued)

*Primary Examiner* — Cong Tran
(74) *Attorney, Agent, or Firm* — Thien T. Nguyen

(57) ABSTRACT

A mobile device synchronously scans different terrestrial networks for positioning measurements to align the scans in time. With minimal time difference between the scans, the positioning measurements from the different terrestrial networks may be used for crowdsourcing or position determination. The mobile device may synchronously scan a wireless wide area network (WWAN) and a local area wireless network so that positioning measurement derived from the scans are aligned in time. A local area wireless network is, e.g., a wireless local area networks (WLANs) or wireless personal area network (WPANs) but does not include cellular networks or satellite networks. The scans may be scheduled at a hardware level to ensure tight synchronization with near-zero time difference between the scans. Alternatively, the scans may be synchronized at a software level with only scans that occur within a time difference threshold from each other are used for crowdsourcing or positioning.

30 Claims, 8 Drawing Sheets

(51) Int. Cl.
*H04W 40/00* (2009.01)
*H04W 84/12* (2009.01)

(58) Field of Classification Search
USPC .... 455/404.2, 456.1, 456.3, 41.1, 41.2, 41.3
See application file for complete search history.

(56) References Cited

U.S. PATENT DOCUMENTS

| | | |
|---|---|---|
| 2009/0312036 A1 | 12/2009 | Alizadeh-Shabdiz |
| 2010/0027525 A1* | 2/2010 | Zhu ................... H04W 48/16 370/350 |
| 2010/0309051 A1 | 12/2010 | Moshfeghi |
| 2011/0246148 A1 | 10/2011 | Gupta et al. |
| 2012/0088518 A1 | 4/2012 | Edge |
| 2013/0107748 A1* | 5/2013 | Dravida ............... H04W 60/00 370/252 |
| 2013/0237246 A1* | 9/2013 | Aggarwal ............ G01S 5/0205 455/456.1 |
| 2013/0281110 A1 | 10/2013 | Zelinka et al. |
| 2014/0152495 A1* | 6/2014 | Khushu ................ G01S 5/0263 342/357.39 |
| 2014/0171097 A1 | 6/2014 | Fischer et al. |
| 2014/0232570 A1 | 8/2014 | Skinder et al. |
| 2014/0331272 A1* | 11/2014 | Gupta ................... H04L 63/20 726/1 |
| 2016/0065722 A1* | 3/2016 | Rose ................. H04M 1/72569 370/338 |
| 2017/0078922 A1* | 3/2017 | Raleigh ............... H04W 28/10 |
| 2017/0208540 A1* | 7/2017 | Egner .................. H04W 48/18 |
| 2017/0272900 A1* | 9/2017 | Do ......................... H04W 4/02 |

OTHER PUBLICATIONS

Partial International Search Report—PCT/US2017/039716—ISA/EPO—dated Oct. 10, 2017.
International Search Report and Written Opinion—PCT/US2017/039716—ISA/EPO—dated Jan. 31, 2018.

* cited by examiner

SYNCHRONOUS SCANNING TERRESTRIAL NETWORKS FOR MEASUREMENTS FOR CROWDSOURCING AND POSITIONING

BACKGROUND

Background Field

The subject matter disclosed herein relates to electronic devices, and more particularly to methods and apparatuses for use in or with a mobile device to synchronize scans from multiple terrestrial networks to obtain positioning measurements for crowdsourcing or to be used together for positioning and methods and apparatuses for crowdsourcing using data from synchronized scans.

Relevant Background

Obtaining accurate position information for mobile devices, such as cellular telephones or other wireless communication devices, is becoming prevalent in the communications industry. A common means to determine the location of a device is to use a satellite positioning system (SPS), such as the well-known Global Positioning Satellite (GPS) system or Global Navigation Satellite System (GNSS), which employ a number of satellites that are in orbit around the Earth. Other means commonly used to determine the location of a device includes terrestrial based positioning, which is particularly useful, e.g., when a SPS system is not available or accurate, e.g., when indoors.

During terrestrial based positioning, measurements of signals from nearby transmitters, such as cellular base stations (towers) or WiFi access points, are made. For example, the round trip time (RTT), time difference of arrival (TDOA), received signal strength indicators (RSSI), etc., may be measured using terrestrial signals. To estimate a location of the mobile device based on measurements from terrestrial transmitters, a database that includes geographical information such as the locations of cellular stations, location of access points, RSSI or RTT fingerprint or heatmap, etc., is typically required. The geographical information for terrestrial transmitters is often acquired through crowdsourcing, which mostly depends on the availability of SPS fixes. Unfortunately, SPS positioning is often not available or inaccurate within indoor locations, where terrestrial based positioning is particularly useful. Consequently, database growth and maintenance is compromised.

SUMMARY

A mobile device synchronously scans different types of terrestrial networks for positioning measurements to align the scans in time. With minimal time difference between the scans, the positioning measurements from the different terrestrial networks may be used for crowdsourcing or position determination. For example, the mobile device may synchronously scan a wireless wide area network (WWAN) and a local area wireless network so that positioning measurement derived from the scans are aligned in time. A local area wireless network is, e.g., a wireless local area networks (WLANs) or wireless personal area network (WPANs) but does not include cellular networks or satellite networks. The scans may be scheduled at a hardware level to ensure tight synchronization with near-zero time difference between the scans. Alternatively, the scans may be synchronized at a software level with only scans that occur within a time difference threshold from each other are used for crowdsourcing or positioning.

In one implementation, a method for scanning terrestrial networks for positioning measurements includes synchronizing scans by a mobile device for wireless wide area network (WWAN) based positioning measurements and scans for local area wireless network based positioning measurements to be aligned in time, wherein the local area wireless network comprises wireless local area networks (WLANs) and wireless personal area network (WPANs) and does not include cellular networks or satellite networks; scanning with the mobile device for the WWAN based positioning measurements; scanning with the mobile device for the local area wireless network based positioning measurements; and using the WWAN based positioning measurements and the local area wireless network based positioning measurements that are aligned in time for crowdsourcing or to determine a position fix for the mobile device.

In one implementation, a mobile device for scanning terrestrial networks for positioning measurements includes a wireless wide area network (WWAN) transceiver to scan for WWAN based positioning measurements; a local area wireless network transceiver to scan for local area wireless network based positioning measurements, wherein the local area wireless network comprises wireless local area networks (WLANs) and wireless personal area network (WPANs) and does not include cellular networks or satellite networks; and at least one processor coupled to the WWAN transceiver and the local area wireless network transceiver, the at least one processor configured to synchronize scans for the WWAN based positioning measurements and scans for local area wireless network based positioning measurements to be aligned in time and to use the WWAN based positioning measurements and the local area wireless network based positioning measurements that are aligned in time for crowdsourcing or to determine a position fix for the mobile device.

In one implementation, a mobile device for scanning terrestrial networks for positioning measurements includes a means for synchronizing scans by the mobile device for wireless wide area network (WWAN) based positioning measurements and scans for local area wireless network based positioning measurements to be aligned in time, wherein the local area wireless network comprises wireless local area networks (WLANs) and wireless personal area network (WPANs) and does not include cellular networks or satellite networks; means for scanning with the mobile device for the WWAN based positioning measurements; means for scanning with the mobile device for the local area wireless network based positioning measurements; and means for using the WWAN based positioning measurements and the local area wireless network based positioning measurements that are aligned in time for crowdsourcing or to determine a position fix for the mobile device.

In one implementation, a non-transitory computer-readable medium for scanning terrestrial networks for positioning measurements, the non-transitory computer-readable medium including program code stored thereon, includes program code to synchronize scans by a mobile device for wireless wide area network (WWAN) based positioning measurements and scans for local area wireless network based positioning measurements to be aligned in time, wherein the local area wireless network comprises wireless local area networks (WLANs) and wireless personal area network (WPANs) and does not include cellular networks or satellite networks; program code to scan with the mobile device for the WWAN based positioning measurements; program code to scan with the mobile device for the local area wireless network based positioning measurements; and program code to use the WWAN based positioning measurements and the local area wireless network based positioning measurements that are aligned in time for crowdsourcing or to determine a position fix for the mobile device.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
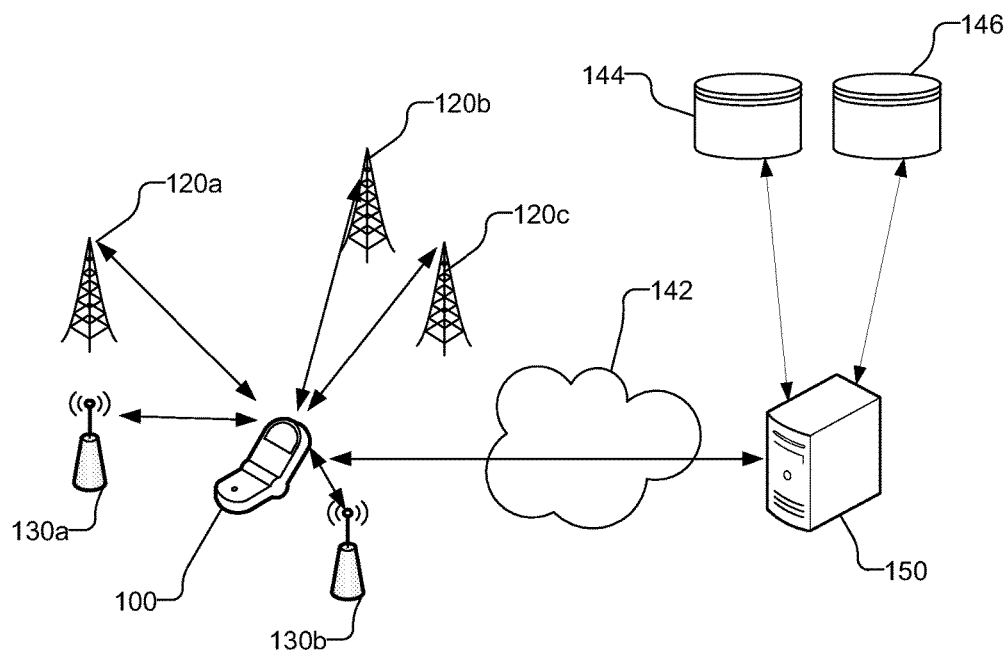
FIG. 1 illustrates mobile device capable of synchronously scanning different terrestrial networks for positioning measurements to be used in crowdsourcing or for determining a position fix.

FIG. 1 illustrates mobile device 100 capable of wireless communication with terrestrial networks, including a wireless wide area network (WWAN) transmitters, illustrated as base stations 120a, 120b, and 120c (collectively referred to as base stations 120), as well as local area wireless network transmitters, illustrated as access points 130a and 130b (collectively referred to as access points 130). The local area wireless network as used herein includes wireless local area networks (WLANs) and wireless personal area network (WPANs) but does not include cellular networks or satellite networks. The mobile device 100 is capable of synchronously scanning for WWAN based positioning measurements, e.g., from base stations 120 and for local area wireless network based positioning measurements, e.g., from access points 130. As used herein, synchronous scanning indicates that the scans occur at substantially the same time, so that the scans are aligned in time. The synchronous scans by the mobile device 100 may be performed at a hardware level, e.g., by scheduling the scans to occur substantially simultaneously, e.g., the scans occur within 100 µs of each other. In another embodiment, the synchronous scans by the mobile device 100 may be performed at a software level, e.g., where scans that are not within a time difference threshold may be discarded. The time difference threshold may be dependent on the speed of the mobile device 100.

The mobile device 100 may communicate with one or more servers 150 via a wireless network 142 through the WWAN transmitters (base station 120) or a local area wireless network transmitter (access point 130). The server 140 is illustrated as being coupled to a WWAN database 144 and a local area wireless network database 146, but it should be understood that a single database that contains information for the WWAN network and the local area wireless network may be used. Data from the WWAN database 144 and/or the local area wireless network database 146 may be used along with the one or more of the measurements from the synchronous scans by the mobile device 100 to determine an estimated position of the mobile device 100. The position estimation may be performed by the mobile device 100, e.g., after receiving the data from the WWAN database 144 and/or the local area wireless network database 146 via the server 150. Alternatively, the position estimation may be performed by the server 150, after receiving the measurements from the synchronous scans from the mobile device 100. Additionally, the mobile device 100 may provide the measurements from the synchronous scans and/or one or more position estimations determined using the measurements from the synchronous scans to the server 150 for crowdsourcing.

Wireless communication techniques described herein may be in connection with various wireless communications networks such as the WWAN network or the local area wireless network, which includes wireless local area networks (WLANs) and wireless personal area network (WPANs), but does not include cellular networks or satellite networks. The term "network" and "system" may be used interchangeably herein.

The WWAN networks, includes e.g., cellular networks, and may be referred to herein sometimes as a cellular network. The WWAN networks, however, as used herein, do not include a satellite network or any of the local area wireless networks. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. The transmitters for the WWAN network may be sometimes referred to herein, as e.g., base stations or cellular towers, but are not limited thereto.

The local area wireless network, may include a WLAN such as an IEEE 802.11x network, sometimes referred to as WiFi™, and a WPAN, which as a Bluetooth network, an IEEE 802.15x, or radio-frequency identification (RFID) networks, and visual light communication (VLC) networks. The transmitters for the local area wireless network may be sometimes referred to herein as access points, but it should be understood that local area wireless network transmitters may include, e.g., access points, routers, bridges, femtocells, Bluetooth transmitters, pico cells, small cells, RFID transmitters and VLC transmitters, and any other WLAN or WPAN transmitters.

The mobile device 100 may further be capable of receiving signals from a satellite positioning system (SPS) (not shown). However, the use of an SPS system is not relevant to the synchronous scanning of the WWAN networks and local area wireless networks for positioning measurements.

In particular implementations, and as discussed below, mobile device 100 may have circuitry and processing resources capable of synchronously scanning for location related measurements from base stations 120 and access points 130 and possibly computing a position fix or estimated location of mobile device 100 based on these location related measurements. In some implementations, location related measurements obtained by mobile device 100 may be transferred to the location server 150, which may be, e.g., an enhanced serving mobile location center (E-SMLC) or SUPL location platform (SLP), after which the server 150 may estimate or determine a location for mobile device 100 based on the measurements. In the presently illustrated example, location related measurements obtained by mobile device 100 may include measurements of signals received from the terrestrial transmitters fixed at known locations (e.g., such as base stations 120 and access points 130).

Mobile device 100 or the separate server 150 may obtain a location estimate for mobile device 100 based on these location related measurements using any one of several position methods such as, for example, Advanced Forward Link Trilateration (AFLT), Observed Time Difference Of Arrival (OTDOA) or Enhanced Cell ID (E-CID) or combinations thereof. In some of these techniques (e.g. AFLT and OTDOA), pseudoranges or timing differences may be measured at mobile device 100 relative to three or more terrestrial transmitters fixed at known locations, based at least in part, on pilots, positioning reference signals (PRS) or other positioning related signals transmitted by the transmitters and received at mobile device 100. Here, server 150 may be capable of providing positioning assistance data to mobile device 100, via network 142, including, for example, information regarding signals to be measured (e.g., signal timing), locations and identities of terrestrial transmitters to facilitate positioning techniques such as AFLT, OTDOA and E-CID. For example, server 150 may access the WWAN database 144 and/or the local area wireless network database 146, which indicates locations and identities of transmitters in a particular region or regions, such as a particular venue, and may provide information descriptive of signals transmitted by a base station 120 or access point 130, such as transmission power and signal timing. In the case of E-CID, a mobile device 100 may obtain measurements of received signal strength indicators (RSSI) for signals received from base stations 120 and/or access points 130 and/or may obtain a round trip signal propagation time (RTT) between mobile device 100 and base stations 120 and/or access points 130. A mobile device 100 may use these measurements together with assistance data received from a server 150 to determine a location for mobile device 100 or may transfer the measurements to the server 150 to perform the same determination.

As the scans of the WWAN network and the local area wireless network are performed by the mobile device 100 simultaneously, i.e., the scans are aligned in time, the positioning measurements from the base stations 120 and the access points 130 are made while the mobile device 100 is at the same position. As used herein, simultaneous indicates that the events occur from 0 to 0.5 s from each other. In general, how simultaneous the scans of the WWAN network and the local area wireless network should be performed is dependent on the user motion/speed. For example, for a stationary or nearly stationary user, scans performed 0.5 s apart are at the same position. If the user is moving quickly, a shorter time difference should be used to ensure that the scans are performed from the same position. Scans may be characterized as simultaneous if the resulting distance between scans is within a desired threshold. In one example, a target for positioning accuracy may be 10 m (i.e., "same position" is considered to be within 10 m), then 0.5 second may be used as a max limit for "simultaneous scan" up to a user speed of 20 m/s (0.5 s*20 m/s=10 m). If higher positioning/crowdsourcing accuracy is targeted (e.g. 1 m accuracy) (i.e., "same position" is considered to be within 1 m), 0.05 second may be used as a max limit for "simultaneous scan" up to a user speed of 20 m/s (0.05 s*20 m/s=1 m). In general, the user's speed may not be known and accordingly, it is desirable to keep the time difference requirement small. By synchronized scans to be aligned in time at the hardware level, the scans will occur, e.g., within 100 μs of each other, which ensures that the scans are performed at the same position regardless of user speed. The scans may alternatively be aligned in time at a software level, in which case simultaneous may be considered to be 0 to 0.5 s from each other, and may be dependent on the user's speed.

Accordingly, the positioning measurements from the base stations 120 and the access points 130 may be used together to generate an accurate estimate of the location of the mobile device 100. In comparison, with a conventional device that does not perform simultaneous scans, the measurements from a WWAN network and the measurements from a local area wireless network may be made from significantly different locations, because the user may have moved its position from one time to a different location at another different time. Accordingly, with a conventional device, an estimated position of the device is typically not based on positioning measurements from both a WWAN network and a local area wireless network without significant errors or uncertainty.

Additionally, for terrestrial based positioning, geographical information, such as the locations of the base stations 120 and access points 130, as well as signal information, from databases 144, 146 is used. For example, the locations of the transmitters, for example, is used along with the determined distances from the transmitters (determined by the position measurements) to determine an estimate of the position of the mobile device through trilateration. The information in the databases 144, 146, is typically acquired through crowdsourcing.

Crowdsourcing is a well-known technique for growing and maintaining databases for terrestrial transmitters. With crowdsourcing, for example, multiple mobile devices may report their current positions along with the signal information received from base stations 120 and/or access points 130 to the server 150. From multiple reports, the server 150 may grow or maintain the databases 144, 146, e.g., by determining or refining the location of base stations 120 or access points 130. Typically, the crowdsourced positions of the mobile devices that are reported to a server are obtained using an SPS system. Unfortunately, SPS systems are often unavailable or are inaccurate at locations where the WWAN and local area wireless network positioning are particularly useful. Consequently, the crowdsourced positions of the mobile devices tend to be inaccurate, thereby comprising the database growth and maintenance. Moreover, the crowdsourced positions of the mobile devices tend to biased to outdoor locations where SPS signals are available, thereby incorrectly biasing the local area wireless network transmitters, e.g., access points, routers, etc., to outdoor locations.

The mobile device 100 is capable of synchronously scanning for WWAN based positioning measurements, e.g., from base stations 120 and for local area wireless network based positioning measurements, e.g., from access points 130, so that the scans are aligned in time. The synchronous scanning with the scans aligned in time is advantageous as the positioning measurements from the base stations 120 and the access points 130 are made while the mobile device 100 is at the same position. Accordingly, position errors are minimized so that the scans from the WWAN and the local area wireless network may be used for crowdsourcing. Moreover, the scans of the WWAN and the local area wireless network have a coordinated schedule. Accordingly, if the mobile device 100 is asleep, the mobile device 100 will only awake one time to perform both scans, in contrast to a device that does not perform synchronous scans, which is required to wake for each of the separately performed WWAN scan and the local area wireless network scan. Accordingly, the wake up power consumption of the mobile device 100 is reduced.

Figure 2:
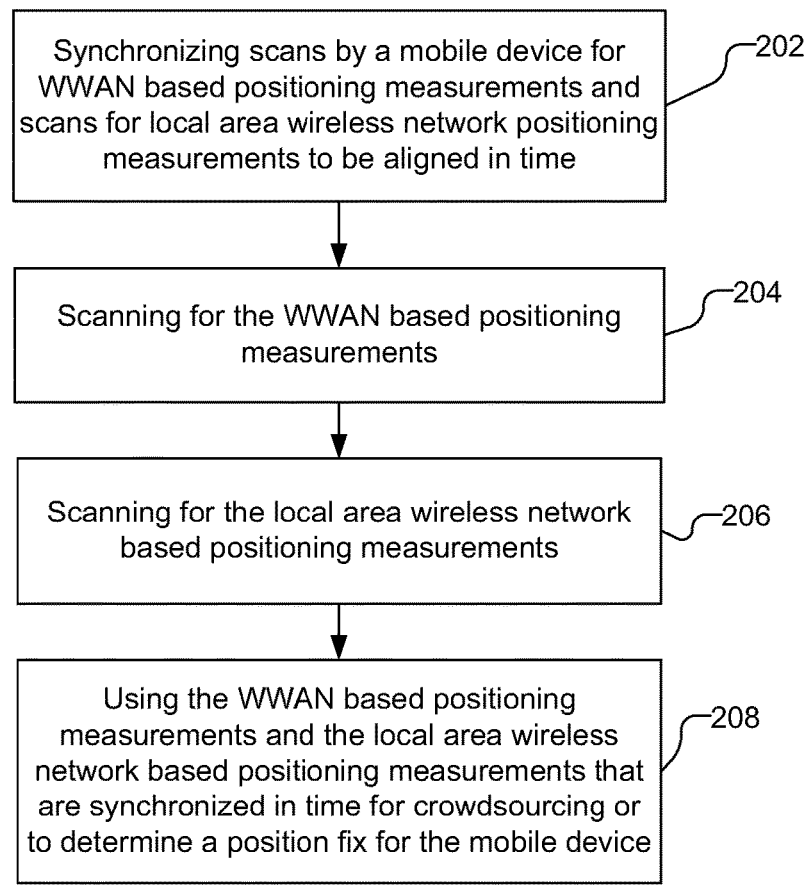
FIG. 2 is a flow chart illustrating a method of synchronously scanning different terrestrial networks for positioning measurements to be used in crowdsourcing or for determining a position fix.

FIG. 2 is a flow chart illustrating a method of synchronously scanning different terrestrial networks for positioning measurements to be used in crowdsourcing or for determining a position fix for a mobile device. As illustrated, the mobile device synchronizes scans by a mobile device for WWAN based positioning measurements and scans for local area wireless network based positioning measurements to be aligned in time (202). The local area wireless network includes wireless local area networks (WLANs) and wireless personal area network (WPANs) and does not include cellular networks or satellite networks. The mobile device scans for the WWAN based positioning measurements (204) and scans for the local area wireless network based positioning measurements (206). The WWAN based positioning measurements and the local area wireless network based positioning measurements that are synchronized to be aligned in time are used for crowdsourcing or to determine a position fix for the mobile device (208). If desired, the mobile device may synchronously scan more than two networks. For example, the mobile device may synchronously scan one or more WWAN networks and one or more local area wireless networks, such as a WiFi network and a Bluetooth network.

The scans may be synchronized to be aligned in time, e.g., by hardware scheduling of the scans for the WWAN based positioning measurements and the scans for the local area wireless network based positioning measurements to occur substantially simultaneously, e.g., within 100 μs of each other. Scheduling the scans to be aligned in time may be advantageous when the mobile device is in sleep mode. For example, the scans may be scheduled to be aligned in time after a processor in the mobile device wakes-up from a sleep mode, which reduces the wake up power necessary to perform scans, compared to a devices that wakes the processor for each unsynchronized WWAN scan and local area wireless network scan.

Figure 3:
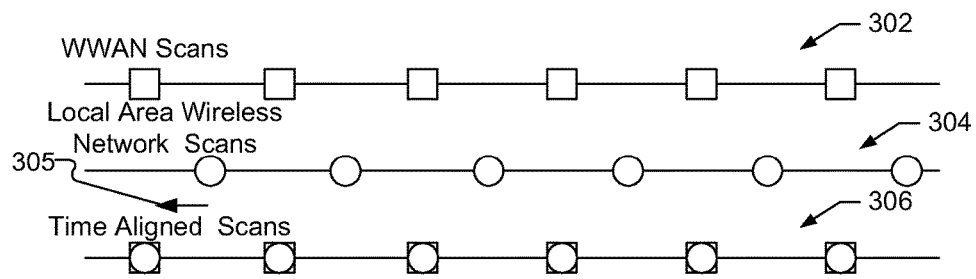
FIG. 3 illustrates an example of synchronizing WWAN scans and local area wireless network scans having the same scanning cycles.

FIG. 3 illustrates an example of synchronizing the WWAN scans and local area wireless network scans. FIG. 3 shows timelines 302 and 304 respectively illustrating the WWAN scans with squares and the local area wireless network scans with circles. The timelines 302 and 304 illustrate the WWAN scans and the local area wireless network scans if the scan were not simultaneous. As can be seen, the WWAN scans in timeline 302 and the local area wireless network scans in timeline 304 each have scanning cycles with the same interval, but the local area wireless network scans in timeline 304 are delayed with respect to the WWAN scans in timeline 302. A third timeline 306 illustrates synchronized WWAN scans (with squares) and local area wireless network scans (with circles) that are aligned in time, which are scheduled by a common scheduler in the mobile device 100 to occur substantially simultaneously. The common scheduler in the mobile device 100, for example, may receive the schedule for the WWAN scans and the local area wireless network scans, and schedules them to occur substantially simultaneously, e.g., by moving the local area wireless network scans to occur earlier (or later) in time, as illustrated by the arrow 305, so as to coincide with the WWAN scans, as illustrated in timeline 306.

Figure 4:
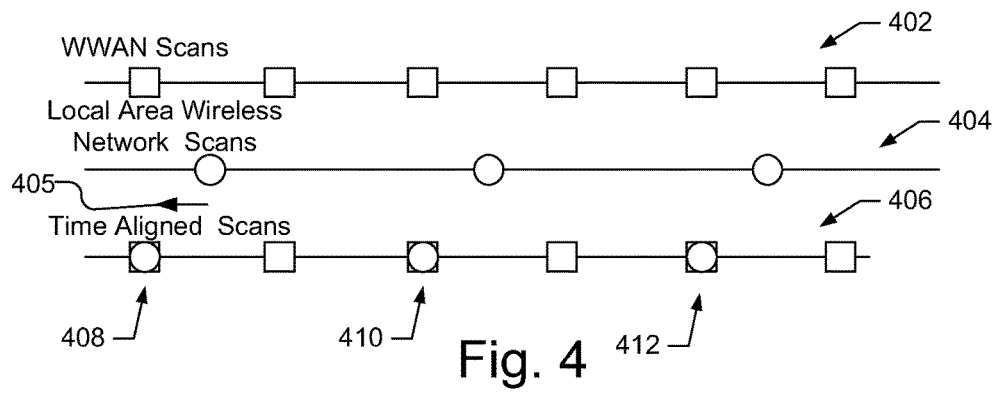
FIG. 4 illustrates an example of synchronizing WWAN scans and local area wireless network scans having the different scanning cycles.

The WWAN scans and the local area wireless network scans, in other embodiments, may have different intervals in their respective scanning cycles. FIG. 4, by way of example, shows timelines 402 and 404 respectively illustrating the WWAN scans with squares and the local area wireless network scans with circles, where the scans are not synchronized to be aligned in time and intervals in their respective scanning cycles differ. Additionally, as can be seen, the local area wireless network scans in timeline 404 are delayed with respect to the WWAN scans in timeline 402. A third timeline 406 illustrates synchronous WWAN scans (with squares) and local area wireless network scans (with circles) that are aligned in time, which are scheduled by a common scheduler in the mobile device 100 to occur substantially simultaneously. Similar to FIG. 3, the common scheduler in the mobile device 100, for example, may receive the schedule for the WWAN scans and the local area wireless network scans, and schedules them to occur substantially simultaneously, e.g., by moving the local area wireless network scans to occur earlier in time, as illustrated by the arrow 405, so as to coincide with the WWAN scans, as illustrated in timeline 406. Additionally, as the WWAN scans and the local area wireless network scans have different intervals, only the positioning measurements that result from the WWAN scans and the local area wireless network scans that are aligned, e.g., at times 408, 410, and 412, are used for crowdsourcing or are used together for positioning. Thus, the common scheduler schedules scans from a least common interval that are aligned in time to be used for crowdsourcing or to be used together for positioning.

Figure 5:
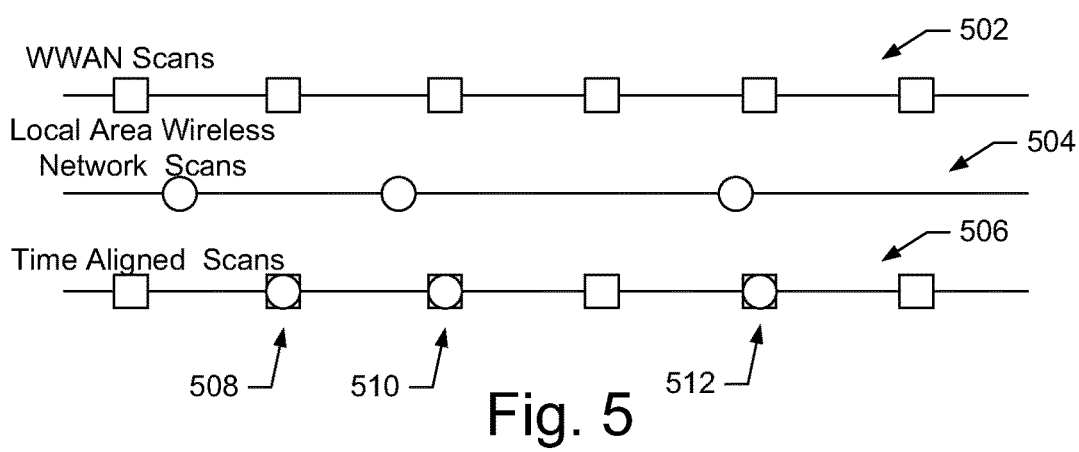
FIG. 5 illustrates an example of synchronizing WWAN scans and local area wireless network scans when the local area wireless network scans are opportunistic.

In another embodiment, one or more of the scans, e.g., the local area wireless network scans or the WWAN scans, may not have a scan cycle, but instead may be opportunistic. For example, FIG. 5 shows a timeline 502 illustrating WWAN scans (with squares) having a scanning cycle, and timeline 504 illustrating the local area wireless network scans (with circles) without a scanning cycle, but instead the local area wireless network scans occur opportunistically. A third timeline 506 illustrates synchronous WWAN scans (with squares) and local area wireless network scans (with circles) that are aligned in time, which are scheduled by a common scheduler in the mobile device 100 to occur substantially simultaneously. The common scheduler in the mobile device 100, for example, may receive the schedule for the WWAN scans and may time trigger the local area wireless network scans based on the WWAN scan, so that when the opportunistic local area wireless network scans arise, they are delayed to occur with the next WWAN scan, so that they are aligned e.g., at times 508, 510, and 512. Similarly, if the WWAN scans are opportunistic and the local area wireless network scans have a scan cycle, the WWAN scans may be triggered based on the local area wireless network scans.

Figure 6:
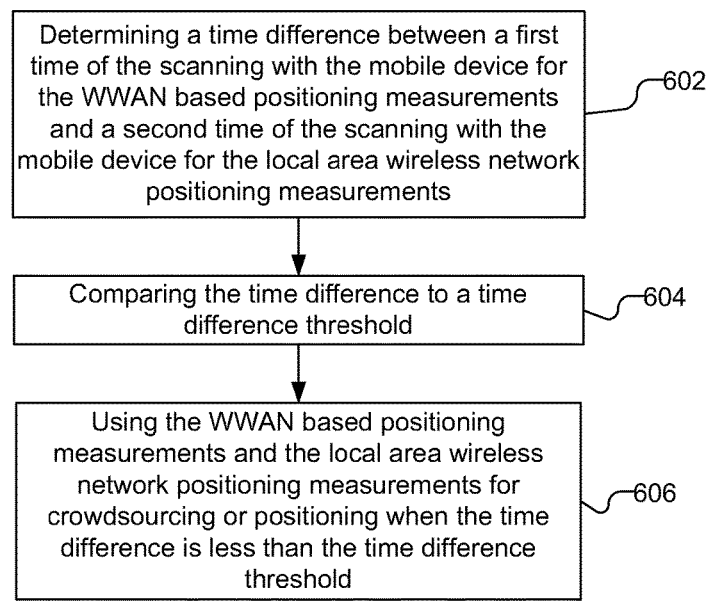
FIG. 6 is a flow chart illustrating a method of synchronizing scans on a software level.

The scans may also be synchronized to be aligned in time, e.g., at a software level, e.g., by discarding any scans that do not occur within a time difference threshold. FIG. 6, by way of example, is a flow chart illustrating a method of synchronizing scans at a software level. A time difference is determined between a first time of the scanning with the mobile device for the WWAN based positioning measurements and a second time of the scanning with the mobile device for the local area wireless network based positioning measurements (602). The time difference is compared to a time difference threshold (604) and the WWAN based positioning measurements and the local area wireless network based positioning measurements are used together for crowdsourcing or to determine the position fix when the time difference is less than the time difference threshold (606).

Figure 7:
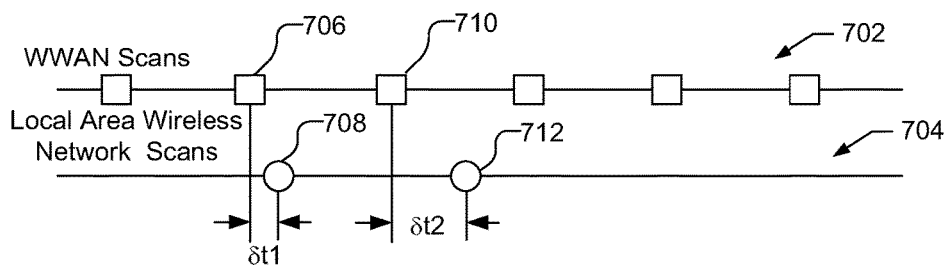
FIG. 7 illustrates an example of synchronizing WWAN scans and local area wireless network scans on a software level.

FIG. 7, by way of example, shows timelines 702 and 704 illustrating WWAN scans with squares and the local area wireless network scans with circles. FIG. 7, illustrates a time difference $\delta t1$ between the times of the WWAN scan 706 and the local area wireless network scan 708 and a time difference $\delta t2$ between the times of the WWAN scan 710 and the local area wireless network scan 712. By comparing the time differences $\delta t1$ and the time difference $\delta t2$ to a time difference threshold, it can be determined whether to use the WWAN based positioning measurement and the local area wireless network based positioning measurements for crowdsourcing or to determine the position fix. By way of example, the time difference $\delta t1$ may be less than the time difference threshold, and so the positioning measurements from WWAN scan 706 and the local area wireless network scan 708 may be used together for crowdsourcing or to be used together to determine a position fix. On the other hand, the time difference $\delta t2$ may be greater than the time difference threshold, and thus, the positioning measurements from WWAN scan 710 and the local area wireless network scan 712 may not be used together for crowdsourcing or used together to determine a position fix.

The time difference threshold may be speed dependent. To minimize differences in the positions of the mobile device when the scans are performed, the time difference threshold may be reduced as the mobile device travels faster. For example, if the mobile device is moving quickly, a small time difference threshold may be desirable. Consequently, if the mobile device has a large speed, the time difference $\delta t1$ may be greater than the time difference threshold and the positioning measurements from WWAN scan 706 and the local area wireless network scan 708 may not be used together for crowdsourcing or used together to determine a position fix. On the other hand, if the mobile device is moving slowly or is stationary, a larger time difference threshold may be desirable so that additional scans may be used for crowdsourcing or positioning without causing errors due to the mobile device traveling a large distance between scans. Consequently, if the mobile device is moving slowly or is stationary, the time difference $\delta t2$ may be smaller than the time difference threshold, and thus, the positioning measurements from WWAN scan 710 and the local area wireless network scan 712 may be used together for crowdsourcing or used together to determine a position fix.

The WWAN based positioning measurements and the local area wireless network based positioning measurements that are synchronized to be aligned in time may be used for crowdsourcing, e.g., by transmitting synchronized WWAN based positioning measurements and local area wireless network based positioning measurements to a crowdsourcing server with or without an associated position fix. The crowdsourcing server, e.g., server 150 in FIG. 1, may update the databases 144 and 146 accordingly. It should be understood that if more than two networks are synchronously scanned by the mobile device, the measurement positions from all of the synchronously scanned networks may be used for crowdsourcing.

Figure 8:
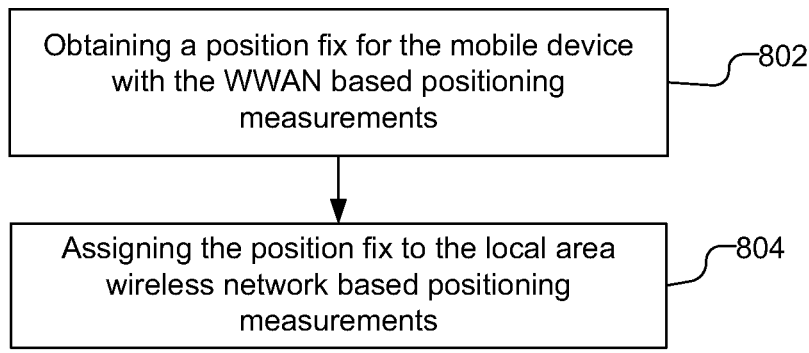
FIG. 8 is a flow chart illustrating a method of crowdsourcing the synchronized WWAN based positioning measurements and local area wireless network based positioning measurements using a position fix determined from the WWAN based positioning measurements.

FIG. 8, by way of example, is a flow chart illustrating a method of crowdsourcing the synchronized WWAN based positioning measurements and the local area wireless network based positioning measurements using a position fix determined from the WWAN based positioning measurements. As shown, a position fix for the mobile device may be obtained with the WWAN based positioning measurements (802) and the position fix may be assigned to the local area wireless network based positioning measurements (804). By way of example, the mobile device 100, shown in FIG. 1, may obtain the position fix, e.g., by determining the position fix itself or by obtaining the position fix from the server 150. The mobile device 100 may associate the position fix with the local area wireless network based positioning measurements and transmit the local area wireless network based positioning measurements with associated position fix to the server 150. Alternatively, the server 150 may obtain the position fix, e.g., by determining the position fix from the WWAN based positioning measurements transmitted from the mobile device 100 or by obtaining the position fix from the mobile device 100. The server 150 may associate the position fix with the local area wireless network based positioning measurements and may update one or both databases 144, 146 accordingly.

Figure 9:
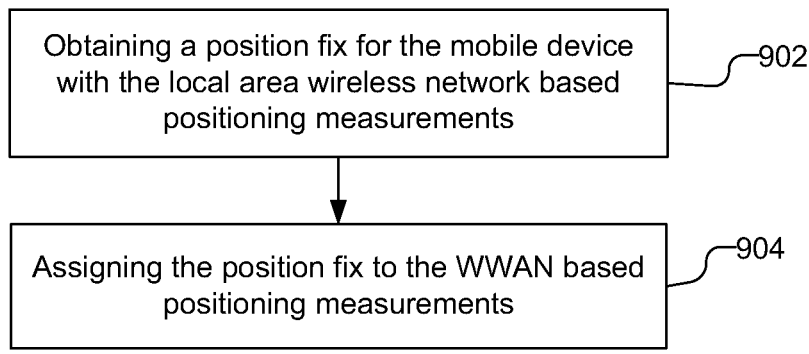
FIG. 9 is a flow chart illustrating a method of crowdsourcing the synchronized WWAN based positioning measurements and local area wireless network based positioning measurements using a position fix determined from the local area wireless network based positioning measurements.

FIG. 9, by way of example, is a flow chart illustrating a method of crowdsourcing the synchronized WWAN based positioning measurements and local area wireless network based positioning measurements using a position fix determined from the local area wireless network based positioning measurements. As shown, a position fix for the mobile device may be obtained with the local area wireless network based positioning measurements (902) and the position fix may be assigned to the WWAN positioning measurements (904). By way of example, the mobile device 100, shown in FIG. 1, may obtain the position fix, e.g., by determining the position fix itself or by obtaining the position fix from the server 150. The mobile device 100 may associate the position fix with the WWAN positioning measurements and transmit the WWAN positioning measurements with associated position fix to the server 150. Alternatively, the server 150 may obtain the position fix, e.g., by determining the position fix from the local area wireless network based positioning measurements transmitted from the mobile device 100 or by obtaining the position fix from the mobile device 100. The server 150 may associate the position fix with the WWAN positioning measurements and may update one or both databases 144, 146 accordingly.

When a position fix for the mobile device is not possible with either the WWAN based positioning measurements or the local area wireless network based positioning measurements, the WWAN based positioning measurements and the local area wireless network based positioning measurements may be associated together for crowdsourcing. By way of example, the mobile device 100 may associate the WWAN based positioning measurements and the local area wireless network based positioning measurements together and transmit the data to the server 150. In one example, there may be an adequate number of positioning measurements for a position fix, e.g., there may be positioning measurements from three or more base stations 120 or access points 130, but the mobile device 100 may have insufficient information for the base stations or access points to generate the position fix (i.e., the location of one or more base stations 120 or access points 130 is unknown). The server 150, however, may have enough information to generate a position fix. Thus, by associating the WWAN based positioning measurements and the local area wireless network based positioning measurements together and transmitting the data to the server 150, the server 150 may generate the position fix. If the server 150 does not have enough information to generate the position fix, the server 150 may store the associated measurements, e.g., in databases 144, 146, for future use. For example, in the future, the server 150 may obtain information (e.g., the location of one or more base stations 120 or access points 130) with which a position fix may be generated using the stored WWAN based positioning measurements or the local area wireless network based positioning measurements. The position fix may then be associated with the WWAN based positioning measurements or the local area wireless network based positioning measurements.

In another example, there may not be an adequate number of positioning measurements obtained by the mobile device to generate a position fix, e.g., there may be positioning measurements from less than three base stations 120 or access points 130. Even though a position fix cannot be obtained, the WWAN based positioning measurements may be used to constrain the uncertainty associated with the local area wireless network based positioning measurements. For example, the uncertainty associated with an access point 130 may be constrained using a WWAN based positioning measurement from a single base station 120, which may be superior to having no constraint on the uncertainty or constraining the uncertainty merely on the base station identification alone. Further, with WWAN based positioning measurements from two base stations 120, a Reference Signal Time Difference measurement (RSTD) may be used to constrain the uncertainty associated with the access point 130 sufficiently to be used as a position estimate.

Figure 10:
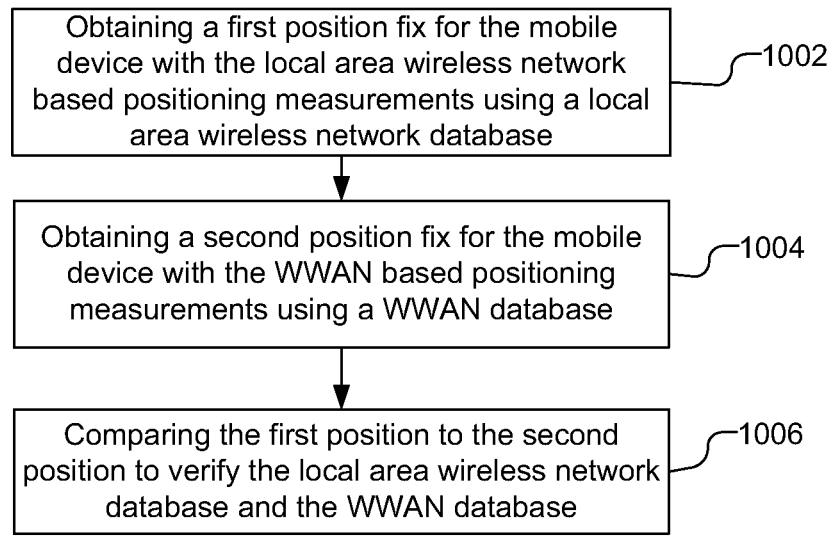
FIG. 10 is a flow chart illustrating another method of crowdsourcing when position fixes may be obtained from the synchronized WWAN based positioning measurements and the local area wireless network based positioning measurements and used to verify WWAN and local area wireless network databases.

FIG. 10 is a flow chart illustrating another method of crowdsourcing when position fixes may be obtained using the synchronized WWAN based positioning measurements and the local area wireless network based positioning measurements. As illustrated, a first position fix is obtained for the mobile device with the local area wireless network based positioning measurements using a local area wireless network database (1002). A second position fix for the mobile device is obtained with the WWAN based positioning measurements using a WWAN database (1004). The first position is compared to the second position to verify the local area wireless network database and the WWAN database (1006). The position fixes may be obtained by the mobile device 100, e.g., by generating the position fixes using information from the databases 144, 146 transmitted by the server 150. Alternatively, the server 150 may generate the position fixes using the information from the databases 144, 146. The server 150 may transmit the position fixes to the mobile device 100 to verify the databases or the server 150 itself may compare the position fixes and verify the databases. It should be understood that if more than two networks are synchronously scanned by the mobile device, position fixes from the additional networks may also be used to verify the databases.

Figure 11:
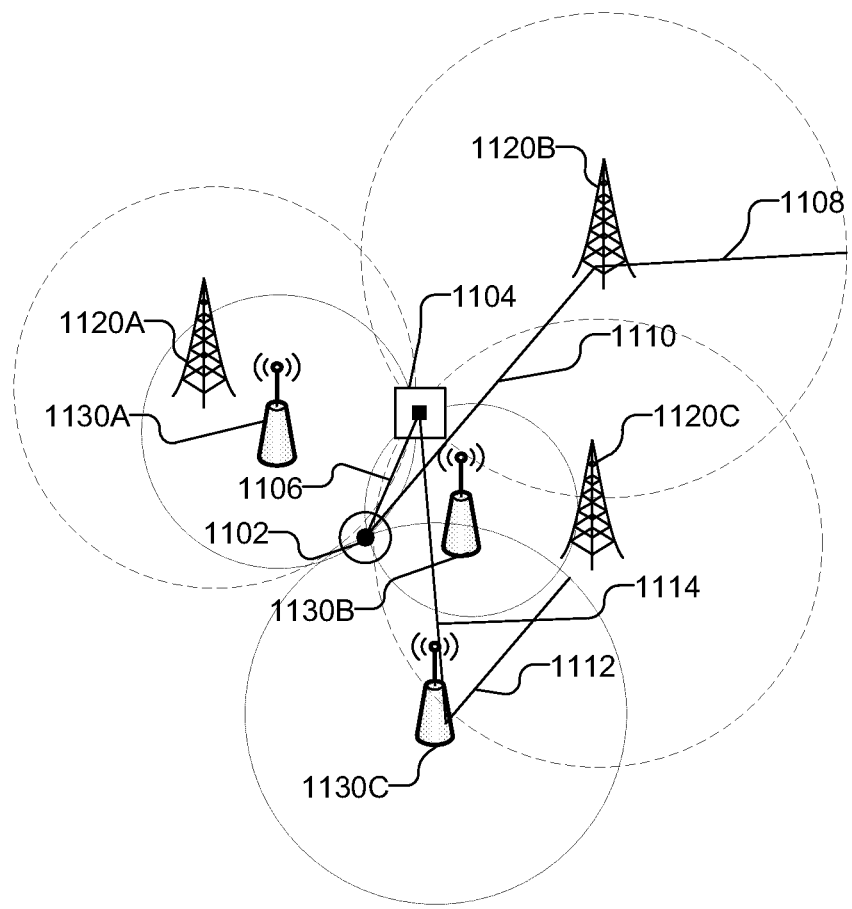
FIG. 11 illustrates a plurality of base stations and access points and associated positioning measurements to determine position fixes with which the WWAN and local area wireless network databases may be verified.

FIG. 11, by way of example, illustrates a plurality of base stations 1120A, 1120B, 1120C and access points 1130A, 1130B, 1130C and associated radius rings, which may be determined from positioning measurements, e.g., TOA, RTT, TDOA, RSSI, etc., from the associated transmitters. A first position fix 1102 is generated based on the local area wireless network based positioning measurements from access points 1130A, 1130B, and 1130C using the local area wireless network database that provides the locations of the access points. A second position fix 1104 is generated based on the WWAN positioning measurements from base stations 1120A, 1120B, and 1120C using the WWAN database that provides the locations of the base stations. If the distance 1106 between the first position fix 1102 and the second position fix 1104 is greater than a distance threshold, the first position fix 1102 and the second position fix 1106 may be considered to not match, indicating that there is an error in one or both databases.

The first position fix 1102, based on the local area wireless network based positioning measurements, may be used as a reference location with which one or more errors in the WWAN database may be determined. For example, an outlying base station in the WWAN database may be identified by comparing the distance derived from the WWAN based positioning measurement (e.g., TOA, RTT, TDOA, RSSI, etc.) for a base station to the distance between the location of the base station as provided by the WWAN database and the reference location. Thus, as illustrated in FIG. 11, for base station 1120B, the distance derived from the WWAN based positioning measurement (e.g., the radius 1108 of radius ring around base station 1120B) is compared to the distance 1110 between the location of the base station 1120B as provided by the WWAN database and the reference location 1102. The difference in distances is determined for each base station, and the base station with the largest difference may be flagged in the WWAN database as suspicious, or if the difference is greater than a threshold, may be flagged as incorrect.

Similarly, the second position fix 1104, based on the WWAN positioning measurements, may be used as a reference location with which one or more errors in the local area wireless network database may be determined. For example, an outlying access point in the local area wireless network database may be identified by comparing the distance derived from the local area wireless network based positioning measurement (e.g., TOA, RTT, TDOA, RSSI, etc.) for an access point to the distance between the location of the access point as provided by the local area wireless network database 146 and the reference location. Thus, as illustrated in FIG. 11, for access point 1130C, the distance derived from the local area wireless network positioning measurement (e.g., the radius 1112 of radius ring around access point 1130C) is compared to the distance 1114 between the location of the access point 1130C as provided by the local area wireless network database and the reference location 1104, taking into account, if necessary, the turnaround calibration factor, which is an additional processing delay on access points. The difference in distances is determined for each access point, and the access point with the largest difference may be flagged in the local area wireless network database as suspicious, or if the difference is larger than a threshold, may be flagged as incorrect.

Figure 12:
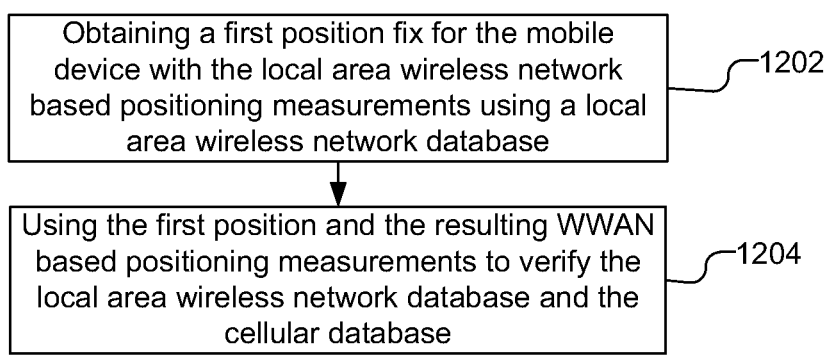
FIG. 12 is a flow chart illustrating another method of crowdsourcing when a position fix may be obtained from the local area wireless network based positioning measurements and used to verify the WWAN database.

FIG. 12 is a flow chart illustrating another method of crowdsourcing when a position fix may be obtained only with the local area wireless network positioning measurement. As shown, a first position fix for the mobile device is obtained with the local area wireless network based positioning measurements using a local area wireless network database (1202). A second position fix for the mobile device is not possible with the WWAN based positioning measurements and a WWAN database. The first position fix and the WWAN based positioning measurements are used to verify the local area wireless network database and the WWAN database (1204). For example, as discussed further in reference to FIG. 13, the first position fix, based on the local area wireless network based positioning measurements, may be used as a reference location to identify base stations with locations in the WWAN database that are suspicious or incorrect by way of consistency checks. That is, the WWAN measurement used along with the WWAN database should result in a position region which is consistent with the reference location derived from the local area wireless network positioning measurements and the local area wireless network database. The first position fix may be obtained by the mobile device 100, e.g., by generating the position fix using information from the local area wireless network databases 146 transmitted by the server 150. Alternatively, the server 150 may generate the position fixes using the information from local area wireless network databases 146. The server 150 may transmit the position fix to the mobile device 100 to verify the databases or the server 150 itself may verify the databases.

Figure 13:
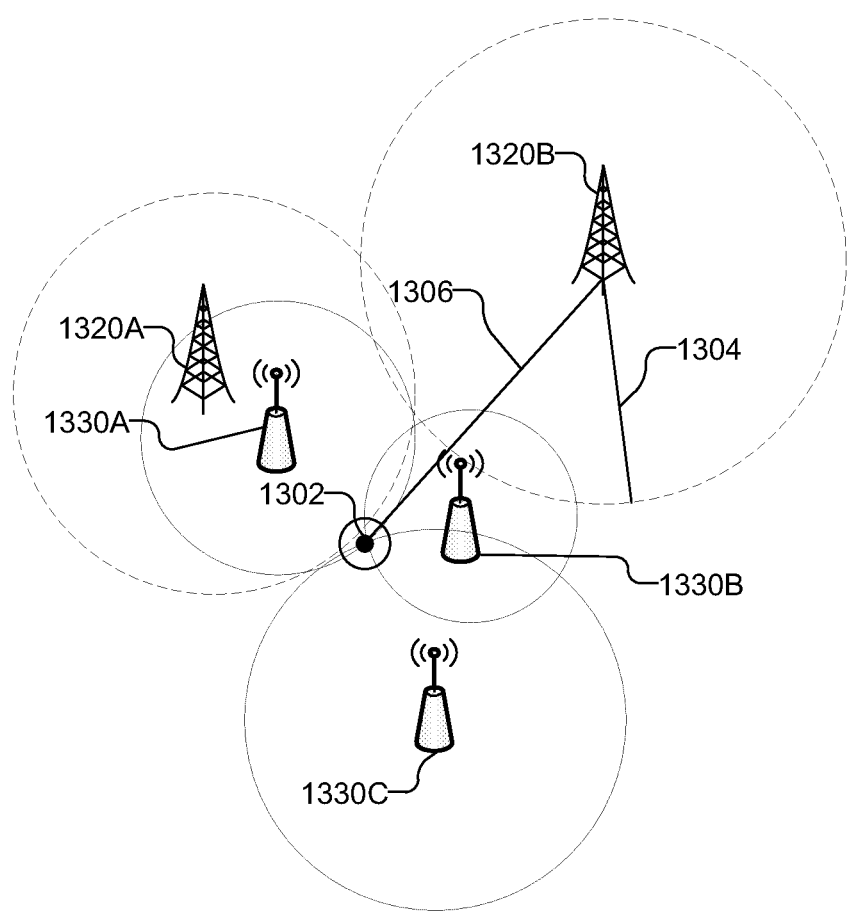
FIG. 13 illustrates a plurality of base stations and access points and associated positioning measurements to determine a position fix with the local area wireless network based positioning measurements with which the WWAN database may be verified.

FIG. 13, similar to FIG. 11, illustrates a plurality of base stations 1320A, 1320B, and access points 1330A, 1330B, 1330C and associated radius rings, which may be determined from positioning measurements, e.g., TOA, RTT, TDOA, RSSI, etc., from the associated transmitters. A first position fix 1302 is generated based on the local area wireless network based positioning measurements from access points 1330A, 1330B, and 1330C using the local area wireless network database that provides the locations of the access points. A second position fix based on the WWAN positioning measurements, however, is not possible as there are only two base stations 1320A and 1320B. The first position fix 1302, based on the local area wireless network based positioning measurements, may be used as a reference location to identify mismatching base stations. For example, a mismatched base station in the WWAN database may be identified by comparing the distance derived from the WWAN based positioning measurement (e.g., TOA, RTT, TDOA, RSSI, etc.) for a base station to the distance between the location of the base station as provided by the WWAN database and the reference location. Thus, as illustrated in FIG. 13, for base station 1320B, the distance derived from the WWAN based positioning measurement (e.g., the radius 1304 of radius ring around base station 1320B) is compared to the distance 1306 between the location of the base station 1320B as provided by the WWAN database and the reference location 1302. If the difference in distances is greater than an error threshold, the location of the base station 1320B in the WWAN database may be flagged as suspicious or incorrect. Alternatively, the uncertainty of any base station identified as mismatching may be increased in proportion to the discrepancy with the first position fix 1302.

Figure 14:
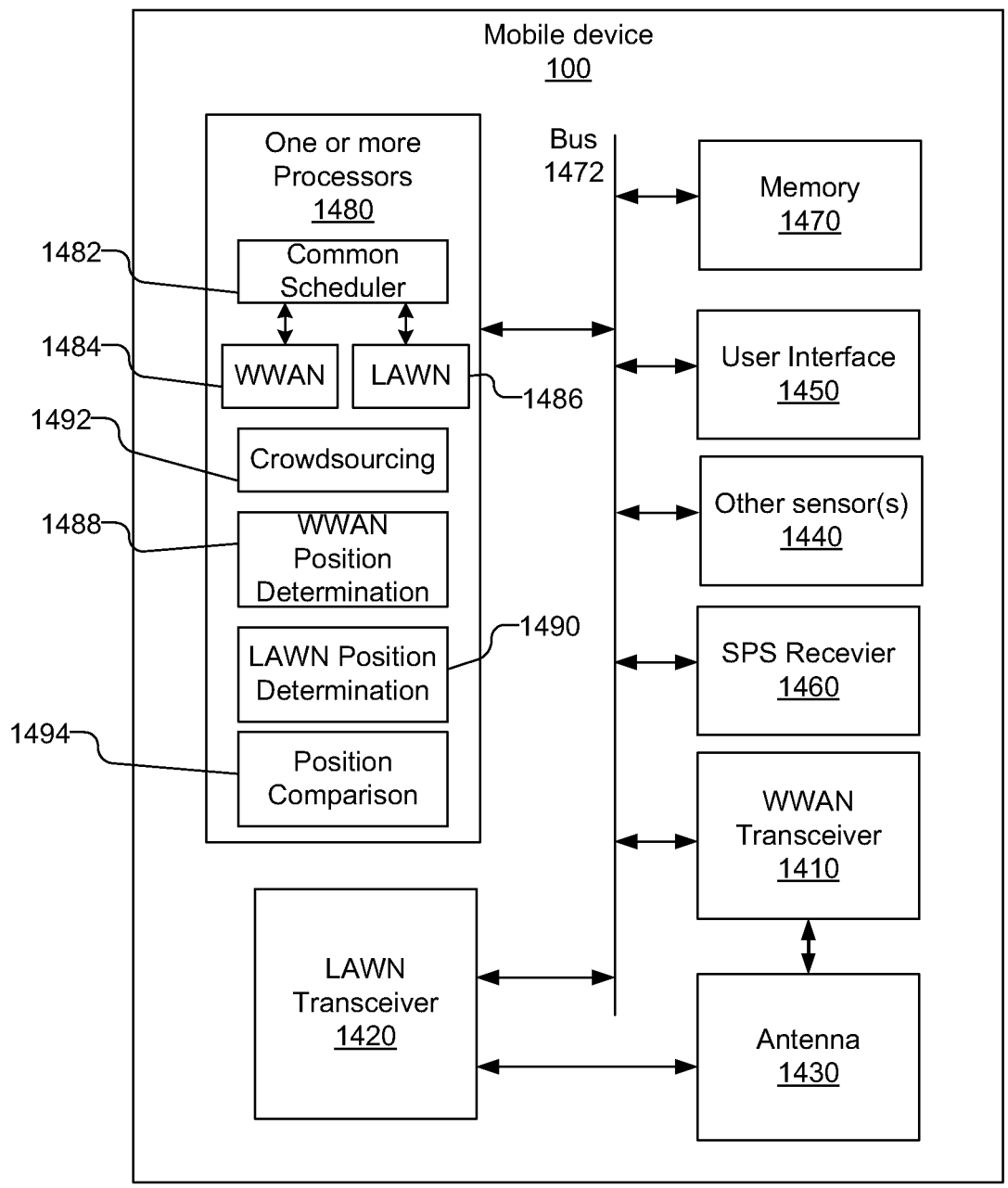
FIG. 14 is a block diagram of a mobile device capable of performing synchronous scans for WWAN based positioning measurements and for local area wireless network based positioning measurements.

FIG. 14 is a block diagram of a mobile device 100 capable of performing synchronous scans for WWAN based positioning measurements and for local area wireless network based positioning measurements, so that the scans are aligned in time. The mobile device 100 includes a WWAN transceiver 1410 to wirelessly communicate with WWAN transmitters, such as base stations 120 (shown in FIG. 1), a local area wireless network (LAWN) transceiver 1420 to wirelessly communicate with LAWN transmitters, such as access points 130 (shown in FIG. 1), and one or more antennas 1430 that may be used with the WWAN transceiver 1410 and LAWN transceiver 1420. The mobile device 100 may include other sensor(s) 1440, such as accelerometers, gyroscopes, electronic compass, magnetometer, barometer, etc., as well as an SPS receiver 1450. The mobile device 100 may further include a user interface 1450 that may include e.g., a display, a keypad or other input device, such as virtual keypad on the display, through which the user may interface with the mobile device 100.

The mobile device 100 further includes a memory 1470 and one or more processors 1480, which may be coupled together with bus 1472. The processor 1480 and other components of the mobile device 100 may similarly be coupled together with bus 1472, a separate bus, or may be directly connected together or a combination of the foregoing. The memory 1470 may contain executable code or software instructions that when executed by the one or more processors 1480 cause the one or more processors to operate as a special purpose computer programmed to perform the algorithms disclosed herein.

As illustrated in FIG. 14, the one or more processors 1480 may include one or more processing units or components that implement the methodologies as described herein. For example, the one or more processors 1480 may include a common scheduler 1482, which may be configured to receive the schedule for the WWAN scans from the WWAN controller 1484 and the schedule for the LAWN scans from the LAWN controller 1486, and to schedule the WWAN scan and the LAWN scan to occur substantially simultaneously, as discussed herein. By way of example, the scans may be scheduled to occur substantially simultaneously by aligning the scan cycles in time. Moreover, if the WWAN scan and LAWN scans do not have the same intervals in their respective scanning cycles, the common scheduler 1482 may schedule the scans from a least common interval that are aligned in time to be used for crowdsourcing or to be used together for positioning. Moreover, if one of the scans, e.g., the LAWN scan, is opportunistic, the common scheduler 1482 may time trigger the opportunistic scan based on the cyclic scan. As discussed above, the common scheduler 1482 may be a hardware component that schedules the scans at a hardware level. By synchronously scheduling the scans at a hardware level, tight synchronization with near-zero time difference in the scans is possible, e.g., the scans occur within 1 µs or less of each other. In another implementation, the common scheduler 1482 may operate at a software level, i.e., instructions and data are stored on non-transitory computer readable media, e.g., memory 1470, and are configured to cause the one or more processors 1480 to implement the function common scheduler 1482. As discussed above, the common scheduler 1482, when operating at a software level, may be configured to prevent scans that are not within a time difference threshold, e.g., 5 ms, from being used for crowdsourcing or from being used together to determine the position fix. The time difference threshold may be variable, e.g., based on speed, e.g., as determined from the WWAN position determination processing unit 1488 or LAWN position determination processing unit 1490, or from any other source including data from the SPS receiver 1460 (if available) or other sensors 1440, such as inertial sensors.

The one or more processors 1480 may further include the WWAN position determination processing unit 1488, which is configured to generate the WWAN positioning measurements from scans performed by the WWAN transceiver 1410. The WWAN position determination processing unit 1488 may be further configured to determine a position fix from the mobile device 100 based on WWAN position measurements or to cause the WWAN position measurements to be transmitted to the server 150 so that server 150 may determine a position fix for the mobile device 100, which may be transmitted back to the mobile device 100. The one or more processors 1480 may further include the LAWN position determination processing unit 1490, which is configured to generate the local area wireless network based positioning measurements from scans performed by the LAWN transceiver 1420. The LAWN position determination processing unit 1490 may be further configured to determine a position fix from the mobile device 100 based on local area wireless network based positioning measurements or to cause the local area wireless network based positioning measurements to be transmitted to the server 150 so that server 150 may determine a position fix for the mobile device 100, which may be transmitted back to the mobile device 100. The WWAN position determination processing unit 1488 and the LAWN position determination proceeding unit 1490 may operate together so that synchronous scans resulting in the WWAN positioning measurements and the LAWN positioning measurements may be used together to determine a position fix for the mobile device 100.

The one or more processors 1480 may further include a crowdsourcing processing unit 1492 that is configured to crowdsource based on the WWAN positioning measurements and the local area wireless network based positioning measurements from synchronous scans. The crowdsourcing processing unit 1492 may be configured to associate together the WWAN positioning measurements and the local area wireless network based positioning measurements resulting from synchronous scans, or may associate a position fix from the WWAN position determination processing unit 1488 and/or the LAWN position determination processing unit 1490 with the WWAN positioning measurements and/or the local area wireless network based positioning measurements resulting from synchronous scans. The crowdsourcing processing unit 1492 may be further configured to verify the WWAN database and the local area wireless network database. For example, a position comparison processing unit 1494 may be configured to compare position fixes from both networks or to compare a reference position fix from one network to the position measurements from the other network, as discussed above. The crowdsourcing processing unit 1492 may be configured to flag suspect data and/or alter uncertainties associated with transmission sources based on the comparison from the position comparison processing unit 1494, as discussed above. The crowdsourcing processing unit 1492 may be further configured to transmit the crowdsourcing data, e.g., the associated measurements and/or position fixes, identification of suspect database entries, and change in uncertainty, to the server 150, e.g., via WWAN transceiver 1410 or LAWN transceiver 1420, or may be configured to store the crowdsourcing data on board the mobile device 100, e.g., in memory 1470.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD- ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1470, and are configured to cause the one or more processors to operate as a special purpose computer programmed to perform the algorithms disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, the mobile device 100 includes a means for synchronizing scans for wireless wide area network (WWAN) based positioning measurements and scans for local area wireless network based positioning measurements to be aligned in time, wherein the local area wireless network comprises wireless local area networks (WLANs) and wireless personal area network (WPANs) and does not include cellular networks or satellite networks, which may include, e.g., one or more processors 1480, including a common scheduler 1482. A means for scanning for the WWAN based positioning measurements may include the WWAN transceiver 1410 and the WWAN position determination processing unit 1488. A means for scanning for the local area wireless network based positioning measurements may include the LAWN transceiver 1420 and the LAWN position determination processing unit 1490. A means for using the WWAN based positioning measurements and the local area wireless network based positioning measurements that are aligned in time for crowdsourcing or to determine a position fix for the mobile device may include the crowdsourcing processing unit 1492 and the WWAN position determination processing unit 1488 and the LAWN position determination processing unit 1490.

The means for synchronizing scans in the mobile device may be a hardware scheduling means that schedules the scans for the WWAN based positioning measurements and the scans for the local area wireless network based positioning measurements to occur substantially simultaneously, which may include the common scheduler 1482 implemented in hardware. The means for synchronizing scans may include a means for determining a time difference between a first time of the scanning with the mobile device for the WWAN based positioning measurements and a second time of the scanning with the mobile device for the local area wireless network based positioning measurements; means for comparing the time difference to a time difference threshold; and means for using the WWAN based positioning measurements and the local area wireless network based positioning measurements together for crowdsourcing or to determine the position fix when the time difference is less than the time difference threshold, which may include the common scheduler implemented in software.

The means for using the WWAN based positioning measurements and the local area wireless network based positioning measurements that are aligned in time for crowdsourcing may include means for transmitting the WWAN based positioning measurements and the local area wireless network based positioning measurements that are aligned in time to a crowdsourcing server with or without an associated position fix, which may include the crowdsourcing processing unit 1492 and the WWAN transceiver 1410 or the LAWN transceiver 1420.

The means for using the WWAN based positioning measurements and the local area wireless network based positioning measurements that are aligned in time for crowdsourcing may include means for obtaining a position fix for the mobile device with the WWAN based positioning measurements, which may include the WWAN position determination processing unit 1488; and a means for assigning the position fix to the local area wireless network based positioning measurements, which may include the crowdsourcing processing unit 1492.

The means for using the WWAN based positioning measurements and the local area wireless network based positioning measurements that are aligned in time for crowdsourcing may include means for associating the WWAN based positioning measurements and the local area wireless network based positioning measurements together when a position fix for the mobile device is not possible with the WWAN based positioning measurements and the local area wireless network based positioning measurements, which may include the crowdsourcing processing unit 1492. Additionally, a means for constraining an uncertainty associated with the local area wireless network based positioning measurements using the WWAN based positioning measurements may include the crowdsourcing processing unit 1492.

The means for using the WWAN based positioning measurements and the local area wireless network based positioning measurements that are aligned in time for crowdsourcing may include means for obtaining a position fix for the mobile device with the local area wireless network based positioning measurements, which may include the LAWN position determination processing unit 1490. A means for assigning the position fix to the WWAN based positioning measurements may include the crowdsourcing processing unit 1492.

The means for using the WWAN based positioning measurements and the local area wireless network based positioning measurements that are aligned in time for crowdsourcing may include means for obtaining a first position fix for the mobile device with the local area wireless network based positioning measurements using a local area wireless network database, which may include the LAWN position determination processing unit 1490 and the WWAN transceiver 1410 or LAWN transceiver 1420. A means for obtaining a second position fix for the mobile device with the WWAN based positioning measurements using a WWAN database may include the WWAN position determination processing unit 1488 and the WWAN transceiver 1410 or LAWN transceiver 1420. A means for comparing the first position to the second position to verify the local area wireless network database and the WWAN database may include, e.g., the position comparison processing unit 1494.

The means for using the WWAN based positioning measurements and the local area wireless network based positioning measurements that are aligned in time for crowdsourcing may include means for obtaining a first position fix for the mobile device with the local area wireless network based positioning measurements using a local area wireless network database, wherein a second position fix for the mobile device is not possible with the WWAN based positioning measurements and a WWAN database, which may include the LAWN position determination processing unit 1490 and the WWAN transceiver 1410 or LAWN transceiver 1420. A means for using the first position and the WWAN based positioning measurements to verify the local area wireless network database and the WWAN database may include, e.g., the position comparison processing unit 1494.

Figure 15:
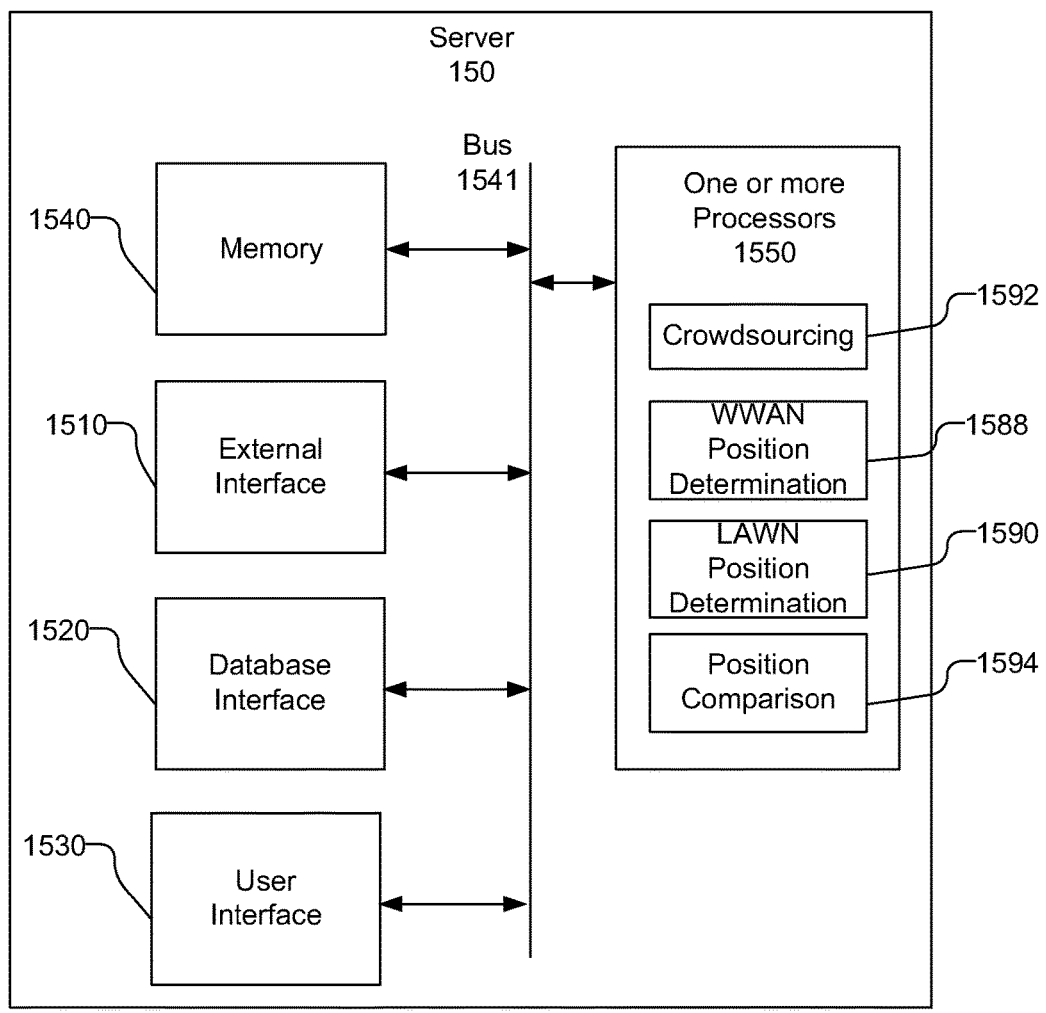
FIG. 15 is a block diagram of a server capable of crowdsourcing based on the WWAN positioning measurements and the local area wireless network based positioning measurements from synchronous scans by the mobile device.

FIG. 15 is a block diagram of a server 150 capable of crowdsourcing based on the WWAN positioning measurements and the local area wireless network based positioning measurements resulting from synchronous scans by the mobile device 100. The server 150 includes an external interface 1510 that is capable of communicating with the mobile device 100, e.g., through the wireless network 142 shown in FIG. 1. The server 150, for example, may use the external interface 1510 to obtain the position measurements from the mobile device 100. Additionally, the server 150 may use the external interface 1510 to receive one or more position fixes determined by the mobile device 100. The external interface 1510 may also be used to provide position fixes to the mobile device 100, e.g., determined by one or both of the WAN positioning measurements and the local area wireless network based positioning measurements from the mobile device 100. The external interface 1510 may also be capable of transmitting data to the mobile device 100, such as assistance data obtained from the databases 144 and 146, shown in FIG. 1, via the database interface 1520. The external interface 1510 may include one or more separate interface devices. For example, the external interface 1510 may include a wired interface that is coupled to a router (not shown) and/or a wireless interface that may support wireless communication such as using GSM, WCDMA, LTE, CDMA, HRPD, WiFi, BT, WiMax, etc., or wireless communication using a wireless LAN (WLAN), DSL or packet cable, for example. The server 150 may further include a user interface 1530 that may include e.g., a display, as well as a keypad or other input device through which the user can input information into the server 150.

The server 150 further includes a memory 1540 and one or more processors 1550, which may be coupled together with bus 1541. The processor 1550 and other components of the server 150 may similarly be coupled together with bus 1541, a separate bus, or may be directly connected together or a combination of the foregoing. The memory 1540 may contain executable code or software instructions that when executed by the one or more processors 1550 cause the one or more processors to operate as a special purpose computer programmed to perform the algorithms disclosed herein.

The one or more processors 1550 may further include a WWAN position determination processing unit 1588, which is configured to determine a position fix based on WWAN position measurements from the mobile device 100. The one or more processors 1550 may further include the LAWN position determination processing unit 1590, which is configured to determine a position fix based on local area wireless network based positioning measurements from the mobile device 100. The WWAN position determination processing unit 1588 and the LAWN position determination proceeding unit 1590 may operate together so that synchronous scans resulting in the WWAN positioning measurements and the LAWN positioning measurements from the mobile device 100 may be used together to determine a position fix for the mobile device 100.

The one or more processors 1550 may further include a crowdsourcing processing unit 1592 that is configured to crowdsource based on the WWAN positioning measurements and the local area wireless network based positioning measurements resulting from synchronous scans transmitted by the mobile device 100. The crowdsourcing processing unit 1592 may be configured to associate together the WWAN positioning measurements and the local area wireless network based positioning measurements resulting from synchronous scans. If a position fix is not possible, e.g., due to lack of information in the database, the crowdsourcing processing unit 1592 may store the associated WWAN positioning measurements and local area wireless network based positioning measurements and may recall the measurements to determine a position fix when the necessary information is available in the database. The crowdsourcing processing unit 1592 may associate a position fix from the WWAN position determination processing unit 1588 and/or the LAWN position determination processing unit 1590 with the WWAN positioning measurements and/or the local area wireless network based positioning measurements resulting from synchronous scans. The crowdsourcing processing unit 1592 may be further configured to verify the WWAN database and the local area wireless network database. For example, a position comparison processing unit 1594 may be configured to compare position fixes from both networks or to compare a reference position fix from one network to the position measurements from the other network, as discussed above. The crowdsourcing processing unit 1592 may be configured to flag suspect data and/or alter uncertainties associated with transmission sources based on the comparison from the position comparison processing unit 1594, as discussed above. The crowdsourcing processing unit 1592 may be further configured to update the WWAN database and the local area wireless network database via the database interface 1520.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1540, and are configured to cause the one or more processors to operate as a special purpose computer programmed to perform the algorithms disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, the server 150 includes means for receiving from a mobile device wireless wide area network (WWAN) based positioning measurements and local area wireless network based positioning measurements that are aligned in time, wherein the local area wireless network comprises wireless local area networks (WLANs) and wireless personal area network (WPANs) and does not include cellular networks or satellite networks, which may include, e.g., the external interface 1510. The server 150 may further include means for using the WWAN based positioning measurements and the local area wireless network based positioning measurements that are aligned in time for crowdsourcing, which may include, e.g., the crowdsourcing processing unit 1592.

The means for using the WWAN based positioning measurements and the local area wireless network based positioning measurements that are aligned in time for crowdsourcing may include means for obtaining a position fix for the mobile device with the WWAN based positioning measurements, which may include the WWAN position determination processing unit 1588; and a means for assigning the position fix to the local area wireless network based positioning measurements, which may include the crowdsourcing processing unit 1592.

The means for using the WWAN based positioning measurements and the local area wireless network based positioning measurements that are aligned in time for crowdsourcing may include means for associating the WWAN based positioning measurements and the local area wireless network based positioning measurements together when a position fix for the mobile device is not possible with the WWAN based positioning measurements and the local area wireless network based positioning measurements, which may include the crowdsourcing processing unit 1592. Additionally, a means for constraining an uncertainty associated with the local area wireless network based positioning measurements using the WWAN based positioning measurements may include the crowdsourcing processing unit 1592.

The means for using the WWAN based positioning measurements and the local area wireless network based positioning measurements that are aligned in time for crowdsourcing may include means for obtaining a position fix for the mobile device with the local area wireless network based positioning measurements, which may include the LAWN position determination processing unit 1590. A means for assigning the position fix to the WWAN based positioning measurements may include the crowdsourcing processing unit 1592.

The means for using the WWAN based positioning measurements and the local area wireless network based positioning measurements that are aligned in time for crowdsourcing may include means for obtaining a first position fix for the mobile device with the local area wireless network based positioning measurements using a local area wireless network database, which may include the LAWN position determination processing unit 1590 and the WWAN transceiver 1510 or LAWN transceiver 1520. A means for obtaining a second position fix for the mobile device with the WWAN based positioning measurements using a WWAN database may include the WWAN position determination processing unit 1588 and the WWAN transceiver 1510 or LAWN transceiver 1520. A means for comparing the first position to the second position to verify the local area wireless network database and the WWAN database may include, e.g., the position comparison processing unit 1594.

The means for using the WWAN based positioning measurements and the local area wireless network based positioning measurements that are aligned in time for crowdsourcing may include means for obtaining a first position fix for the mobile device with the local area wireless network based positioning measurements using a local area wireless network database, wherein a second position fix for the mobile device is not possible with the WWAN based positioning measurements and a WWAN database, which may include the LAWN position determination processing unit 1590 and the WWAN transceiver 1510 or LAWN transceiver 1520. A means for using the first position and the WWAN based positioning measurements to verify the local area wireless network database and the WWAN database may include, e.g., the position comparison processing unit 1594.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for scanning terrestrial networks for positioning measurements comprising:
    synchronizing scans by a mobile device for wireless wide area network (WWAN) based positioning measurements and scans for local area wireless network based positioning measurements to be aligned in time, wherein the local area wireless network comprises wireless local area networks (WLANs) and wireless personal area network (WPANs) and does not include cellular networks or satellite networks;
    scanning with the mobile device for the WWAN based positioning measurements;
    scanning with the mobile device for the local area wireless network based positioning measurements; and
    using the WWAN based positioning measurements and the local area wireless network based positioning measurements that are aligned in time for crowdsourcing or to determine a position fix for the mobile device.

2. The method of claim 1, wherein synchronizing scans comprises hardware scheduling of the scans for the WWAN based positioning measurements and the scans for the local area wireless network based positioning measurements to occur within 100 μs of each other.

3. The method of claim 2, wherein a scanning cycle for the WWAN based positioning measurements has a same interval as a scanning cycle for the local area wireless network based positioning measurement and wherein the hardware scheduling comprises aligning the WWAN based positioning measurements and the local area wireless network based positioning measurements in time.

4. The method of claim 2, wherein a scanning cycle for the WWAN based positioning measurements has a different interval than a scanning cycle for the local area wireless network based positioning measurement and wherein the hardware scheduling comprises aligning the scanning cycle for the WWAN based positioning measurements and the scanning cycle for the local area wireless network based positioning measurements in time and wherein only the WWAN based positioning measurements and the local area wireless network based positioning measurements from scans from a least common interval that are aligned in time are used for crowdsourcing or used together to determine the position fix for the mobile device.

5. The method of claim 2, wherein one of the WWAN based positioning measurements and the local area wireless network based positioning measurements have a scanning cycle and a remaining one of the WWAN based positioning measurements and the local area wireless network based positioning measurements does not have a scanning cycle, and wherein the hardware scheduling comprises time triggering the remaining one of the WWAN based positioning measurements and the local area wireless network based positioning measurements based on the scanning cycle.

6. The method of claim 1, wherein synchronizing scans comprises:
    determining a time difference between a first time of the scanning with the mobile device for the WWAN based positioning measurements and a second time of the scanning with the mobile device for the local area wireless network based positioning measurements;

comparing the time difference to a time difference threshold; and using the WWAN based positioning measurements and the local area wireless network based positioning measurements together for crowdsourcing or to determine the position fix when the time difference is less than the time difference threshold.

7. The method of claim 6, further comprising:

determining a speed of the mobile device; and changing the time difference threshold based on the speed of the mobile device.

8. The method of claim 1, wherein synchronizing scans comprises scheduling scans by the mobile device for WWAN based positioning measurements and scans for local area wireless network based positioning measurements to occur aligned in time after a processor in the mobile device wakes-up from a sleep mode.

9. The method of claim 1, wherein the WWAN based positioning measurements are at least one of time of arrival, time difference of arrival, or received signal strength indicator (RSSI) measurements from one or more cellular base stations and the local area wireless network based positioning measurements are at least one of RSSI and round trip time (RTT) from one or more of an access point, a router, bridge, a femtocell, Bluetooth Transmitter, pico cell, small cell, radio-frequency identification (RFID), and visual light communication (VLC).

10. The method of claim 1, wherein using the WWAN based positioning measurements and the local area wireless network based positioning measurements that are aligned in time for crowdsourcing comprises:

transmitting the WWAN based positioning measurements and the local area wireless network based positioning measurements that are aligned in time to a crowdsourcing server with or without an associated position fix.

11. The method of claim 1, wherein using the WWAN based positioning measurements and the local area wireless network based positioning measurements that are aligned in time for crowdsourcing comprises:

obtaining a position fix for the mobile device with the WWAN based positioning measurements; and assigning the position fix to the local area wireless network based positioning measurements.

12. The method of claim 1, wherein using the WWAN based positioning measurements and the local area wireless network based positioning measurements that are aligned in time for crowdsourcing comprises associating the WWAN based positioning measurements and the local area wireless network based positioning measurements together when a position fix for the mobile device is not possible with the WWAN based positioning measurements and the local area wireless network based positioning measurements.

13. The method of claim 12, further comprising constraining an uncertainty associated with the local area wireless network based positioning measurements using the WWAN based positioning measurements.

14. The method of claim 1, wherein using the WWAN based positioning measurements and the local area wireless network based positioning measurements that are aligned in time for crowdsourcing comprises:

obtaining a position fix for the mobile device with the local area wireless network based positioning measurements; and assigning the position fix to the WWAN based positioning measurements.

15. The method of claim 1, wherein using the WWAN based positioning measurements and the local area wireless network based positioning measurements that are aligned in time for crowdsourcing comprises:

obtaining a first position fix for the mobile device with the local area wireless network based positioning measurements using a local area wireless network database;

obtaining a second position fix for the mobile device with the WWAN based positioning measurements using a WWAN database; and comparing the first position to the second position to verify the local area wireless network database and the WWAN database.

16. The method of claim 1, wherein using the WWAN based positioning measurements and the local area wireless network based positioning measurements that are aligned in time for crowdsourcing comprises:

obtaining a first position fix for the mobile device with the local area wireless network based positioning measurements using a local area wireless network database, wherein a second position fix for the mobile device is not possible with the WWAN based positioning measurements and a WWAN database; and using the first position and the WWAN based positioning measurements to verify the local area wireless network database and the WWAN database.

17. A mobile device for scanning terrestrial networks for positioning measurements comprising:

a wireless wide area network (WWAN) transceiver to scan for WWAN based positioning measurements;

a local area wireless network transceiver to scan for local area wireless network based positioning measurements, wherein the local area wireless network comprises wireless local area networks (WLANs) and wireless personal area network (WPANs) and does not include cellular networks or satellite networks; and at least one processor coupled to the WWAN transceiver and the local area wireless network transceiver, the at least one processor configured to synchronize scans for the WWAN based positioning measurements and scans for local area wireless network based positioning measurements to be aligned in time and to use the WWAN based positioning measurements and the local area wireless network based positioning measurements that are aligned in time for crowdsourcing or to determine a position fix for the mobile device.

18. The mobile device of claim 17, wherein the at least one processor comprises a hardware common scheduler coupled to a WWAN controller that schedules WWAN scans and a local area wireless network controller that schedules local area wireless network scans, the hardware common scheduler schedules the WWAN scans for the WWAN based positioning measurements and the local area wireless network scans for the local area wireless network based positioning measurements to occur within 100 μs of each other.

19. The mobile device of claim 18, wherein a scanning cycle for the WWAN scans has a same interval as a scanning cycle for the local area wireless network scans and wherein the hardware common scheduler aligns the WWAN scans and the local area wireless network scans in time.

20. The mobile device of claim 18, wherein a scanning cycle for the WWAN scans has a different interval than a scanning cycle for the local area wireless network scans and wherein the hardware common scheduler aligns the WWAN scans and the local area wireless network scans in time and wherein only the WWAN based positioning measurements from the WWAN scans and the local area wireless network based positioning measurements from the local area wireless network scans having a least common interval that are aligned in time are used for crowdsourcing or used together to determine the position fix for the mobile device.

21. The mobile device of claim 18, wherein the WWAN scans have a scanning cycle and the local area wireless network scans do not have a scanning cycle, and wherein the hardware common scheduler time triggers the local area wireless network scans based on the WWAN scans.

22. The mobile device of claim 17, wherein the at least one processor is configured to synchronizing scans by being configured to:
   determine a time difference between a first time of the scanning for the WWAN based positioning measurements and a second time of the scanning for the local area wireless network based positioning measurements;
   compare the time difference to a time difference threshold; and
   use the WWAN based positioning measurements and the local area wireless network based positioning measurements together for crowdsourcing or to determine the position fix when the time difference is less than the time difference threshold.

23. The mobile device of claim 22, wherein the time difference threshold is variable based on a speed of the mobile device.

24. The mobile device of claim 17, wherein the at least one processor is configured to synchronizing scans by being configured to schedule WWAN scans and local area wireless network scans to occur aligned in time after the at least one processor wakes-up from a sleep mode.

25. The mobile device of claim 17, wherein the WWAN based positioning measurements are at least one of time of arrival, time difference of arrival, or received signal strength indicator (RSSI) measurements from one or more cellular base stations and the local area wireless network based positioning measurements are at least one of RSSI and round trip time (RTT) from one or more of an access point, a router, bridge, a femtocell, Bluetooth Transmitter, pico cell, small cell, radio-frequency identification (RFID), and visual light communication (VLC).

26. A mobile device for scanning terrestrial networks for positioning measurements comprising:
   means for synchronizing scans by the mobile device for wireless wide area network (WWAN) based positioning measurements and scans for local area wireless network based positioning measurements to be aligned in time, wherein the local area wireless network comprises wireless local area networks (WLANs) and wireless personal area network (WPANs) and does not include cellular networks or satellite networks;
   means for scanning with the mobile device for the WWAN based positioning measurements;
   means for scanning with the mobile device for the local area wireless network based positioning measurements; and
   means for using the WWAN based positioning measurements and the local area wireless network based positioning measurements that are aligned in time for crowdsourcing or to determine a position fix for the mobile device.

27. The mobile device of claim 26, wherein the means for synchronizing scans comprises a hardware scheduling means that schedules the scans for the WWAN based positioning measurements and the scans for the local area wireless network based positioning measurements to occur within 100 µs of each other.

28. The mobile device of claim 26, wherein the means for synchronizing scans comprises a software scheduling means comprising:
   means for determining a time difference between a first time of the scanning with the mobile device for the WWAN based positioning measurements and a second time of the scanning with the mobile device for the local area wireless network based positioning measurements;
   means for comparing the time difference to a time difference threshold; and
   means for using the WWAN based positioning measurements and the local area wireless network based positioning measurements together for crowdsourcing or to determine the position fix when the time difference is less than the time difference threshold.

29. A non-transitory computer-readable medium for scanning terrestrial networks for positioning measurements, the non-transitory computer-readable medium including program code stored thereon, comprising:
   program code to synchronize scans by a mobile device for wireless wide area network (WWAN) based positioning measurements and scans for local area wireless network based positioning measurements to be aligned in time, wherein the local area wireless network comprises wireless local area networks (WLANs) and wireless personal area network (WPANs) and does not include cellular networks or satellite networks;
   program code to scan with the mobile device for the WWAN based positioning measurements;
   program code to scan with the mobile device for the local area wireless network based positioning measurements; and
   program code to use the WWAN based positioning measurements and the local area wireless network based positioning measurements that are aligned in time for crowdsourcing or to determine a position fix for the mobile device.

30. The non-transitory computer-readable medium of claim 29, wherein the program code to synchronize scans comprises:
   program code to determine a time difference between a first time of the scanning with the mobile device for the WWAN based positioning measurements and a second time of the scanning with the mobile device for the local area wireless network based positioning measurements;
   program code to compare the time difference to a time difference threshold; and
   program code to use the WWAN based positioning measurements and the local area wireless network based positioning measurements together for crowdsourcing or to determine the position fix when the time difference is less than the time difference threshold.

* * * * *